(12) United States Patent
Brouwer et al.

(10) Patent No.: US 9,121,994 B2
(45) Date of Patent: Sep. 1, 2015

(54) METHOD OF FABRICATING A WAFER LEVEL OPTICAL LENS ASSEMBLY

(71) Applicant: Anteryon Wafer Optics B.V., Eindhoven (NL)

(72) Inventors: Willem Matthijs Brouwer, Eindhoven (NL); Edwin Maria Wolterink, Valkenswaard (NL)

(73) Assignee: Anteryon Wafer Optics B.V. (NL)

( * ) Notice: Subject to any disclaimer, the term of this patent is extended or adjusted under 35 U.S.C. 154(b) by 0 days.

(21) Appl. No.: 14/109,490

(22) Filed: Dec. 17, 2013

(65) Prior Publication Data
US 2015/0168666 A1    Jun. 18, 2015

(51) Int. Cl.
  *G02B 7/02*  (2006.01)
  *B32B 37/00*  (2006.01)
  *B32B 37/24*  (2006.01)
  *B32B 37/26*  (2006.01)
  *B32B 38/00*  (2006.01)
  *B29C 45/14*  (2006.01)
  *B29D 11/00*  (2006.01)
  *B29K 101/00*  (2006.01)
  *B29L 11/00*  (2006.01)

(52) U.S. Cl.
  CPC .......... *G02B 7/021* (2013.01); *B29C 45/14811* (2013.01); *B32B 37/0084* (2013.01); *B32B 37/24* (2013.01); *B32B 37/26* (2013.01); *B32B 38/0008* (2013.01); *B29D 11/0073* (2013.01); *B29K 2101/00* (2013.01); *B29L 2011/0016* (2013.01); *B32B 2037/243* (2013.01); *B32B 2038/0076* (2013.01); *B32B 2307/412* (2013.01); *B32B 2310/0831* (2013.01); *B32B 2398/00* (2013.01); *B32B 2551/00* (2013.01)

(58) Field of Classification Search
  USPC .................................. 359/694–704, 811–830
  See application file for complete search history.

(56) References Cited

U.S. PATENT DOCUMENTS

| | | | | |
|---|---|---|---|---|
| 7,974,023 | B1 * | 7/2011 | Chen | 359/819 |
| 8,289,635 | B2 * | 10/2012 | Rossi et al. | 359/796 |
| 2008/0246066 | A1 * | 10/2008 | Lake | 257/294 |
| 2010/0321802 | A1 * | 12/2010 | Kim et al. | 359/811 |

\* cited by examiner

*Primary Examiner* — Mohammed Hasan
(74) *Attorney, Agent, or Firm* — Wood, Phillips, Katz, Clark & Mortimer

(57) ABSTRACT

The present invention relates to method of fabricating a wafer level optical lens substrate. The method comprising providing a first wafer substrate having a plurality of bumps, applying a first polymer liquid on a first contact optical surface of said plurality of bumps, providing a second wafer substrate, and contacting said first wafer substrate with said second substrate in such that said first polymer liquid is located in a slit created between said first contact optical surface of said plurality of bumps and said second wafer substrate under capillary forces. The method comprises thereafter curing said polymer liquid(s) to form a lens.

24 Claims, 18 Drawing Sheets

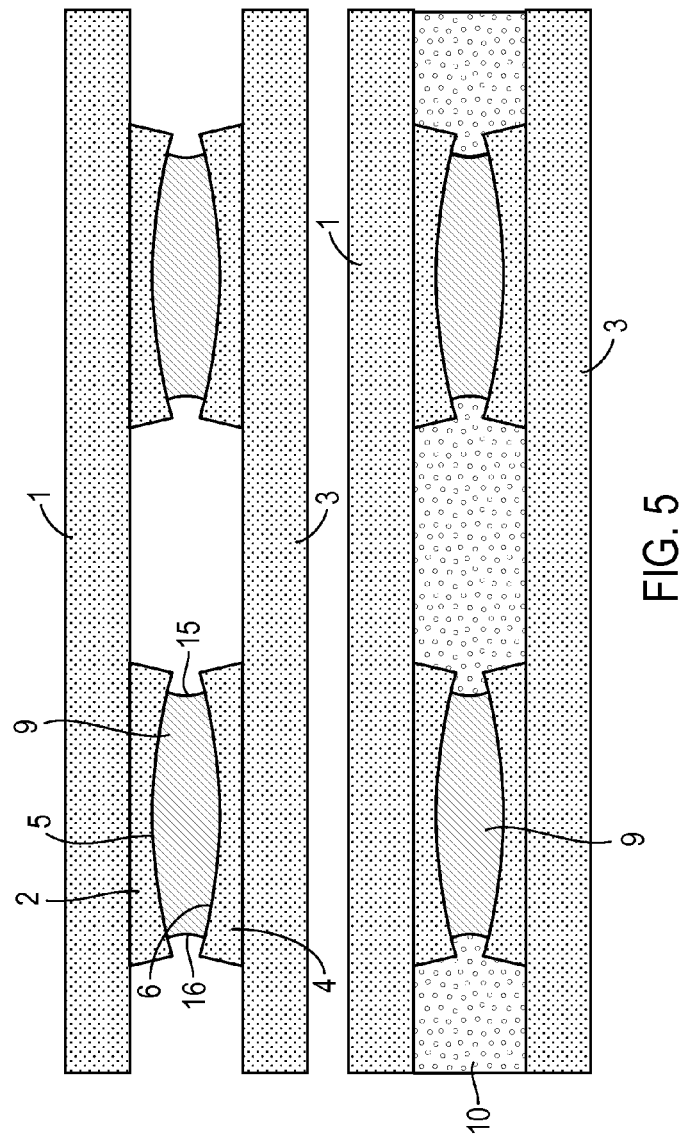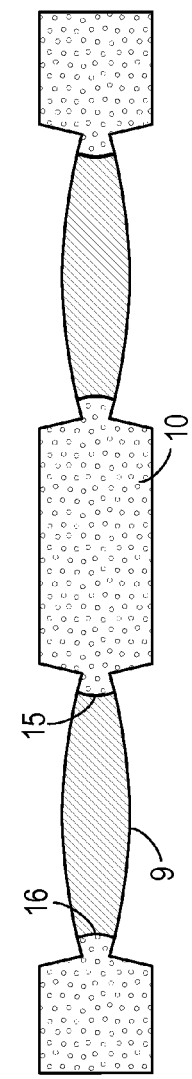
FIG. 5
FIG. 6

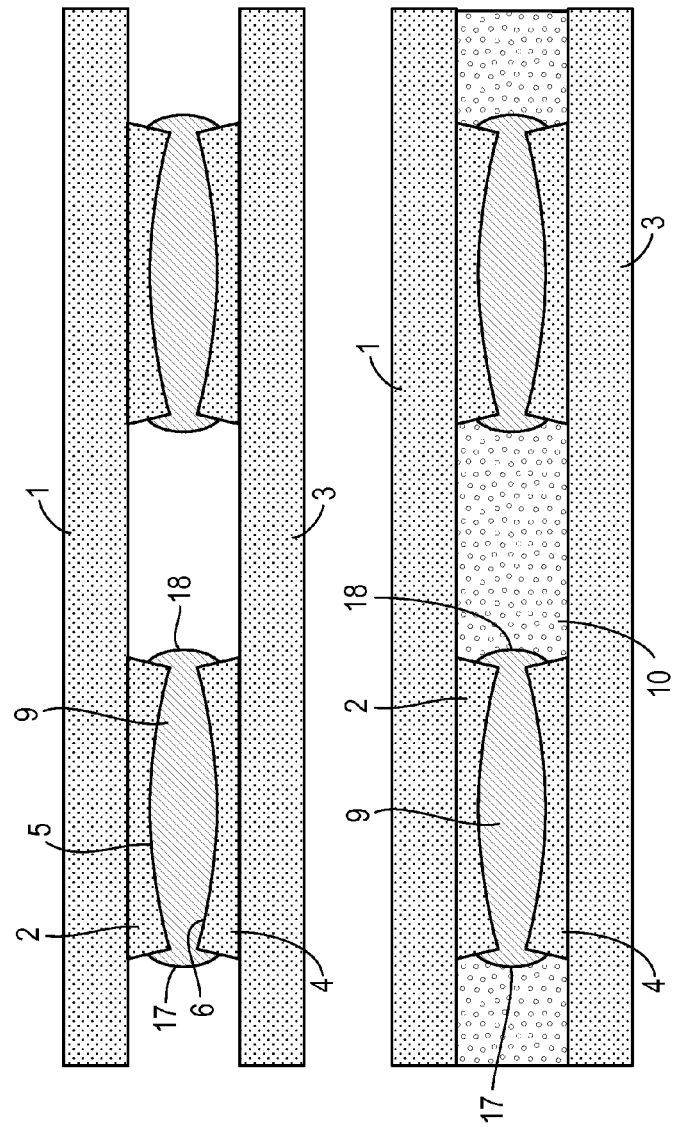
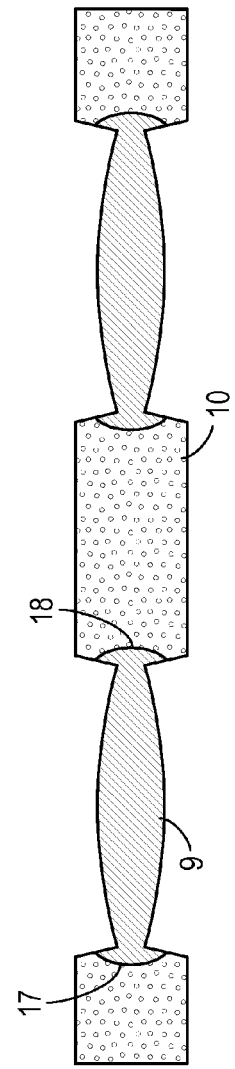
FIG. 7
FIG. 8

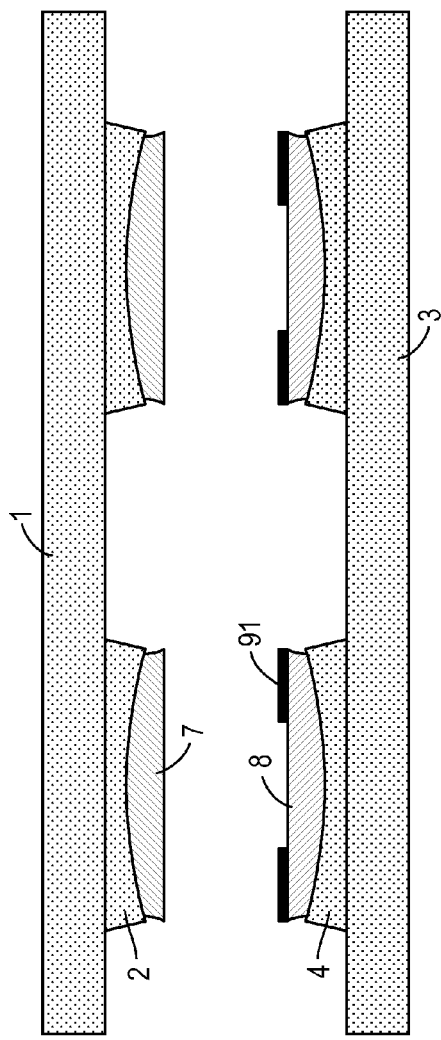
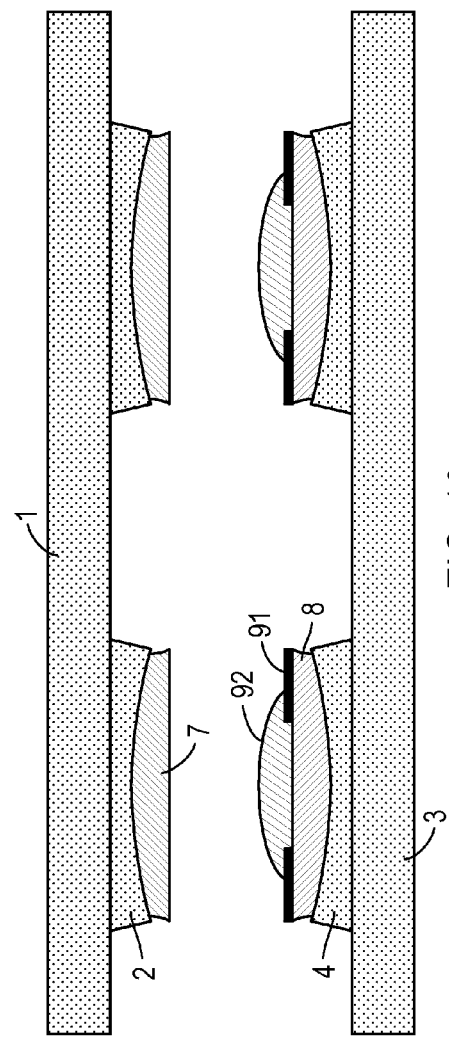

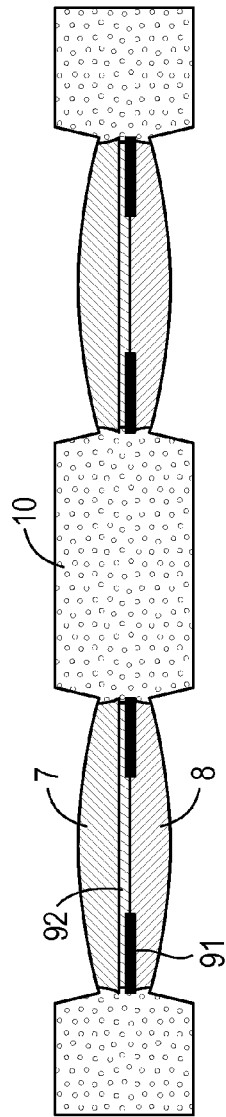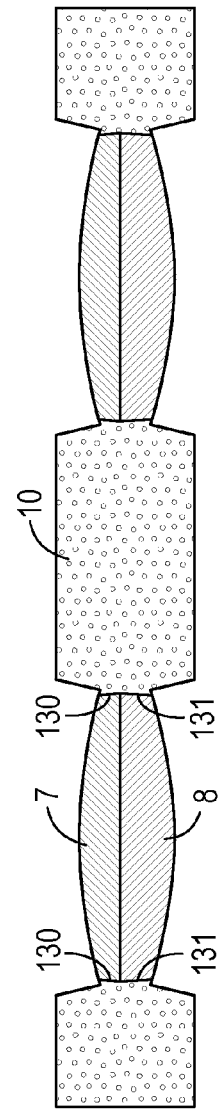

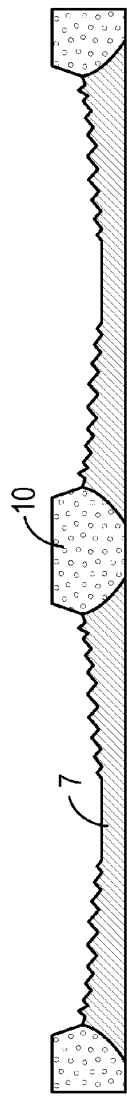
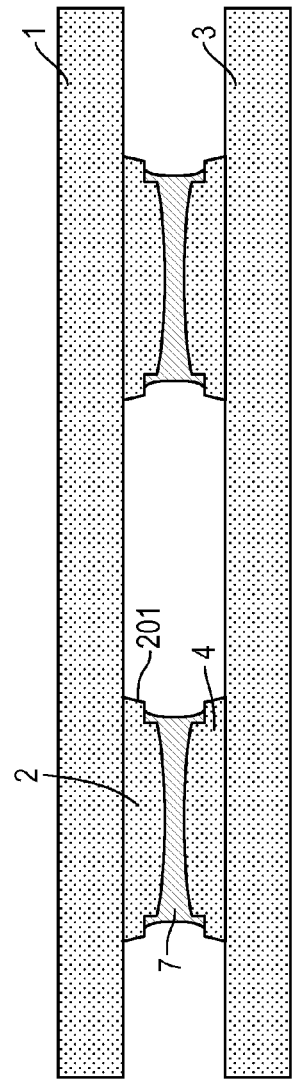
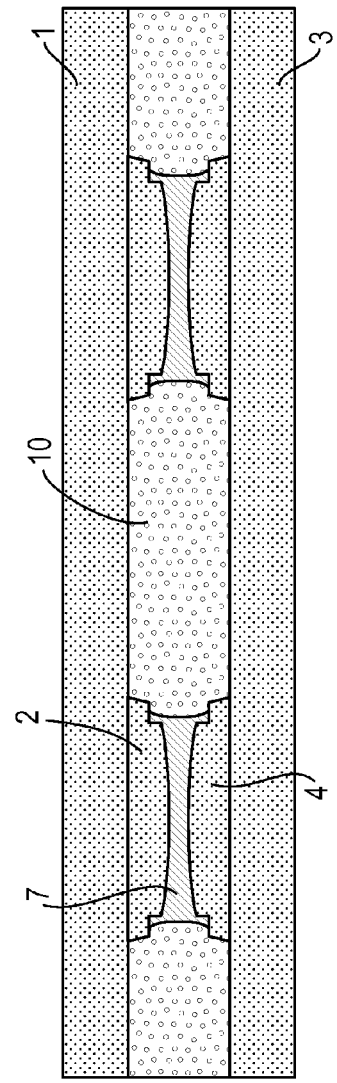
FIG. 20
FIG. 21

METHOD OF FABRICATING A WAFER LEVEL OPTICAL LENS ASSEMBLY

TECHNICAL FIELD

The present invention relates to a method of fabricating a wafer level optical lens substrate. In addition, the present invention relates to lenses obtained according to such a method, especially wafer level optical integral lens supports and to devices incorporating such lenses.

BACKGROUND OF THE INVENTION

Compact camera modules have become a standard component in mobile devices such as mobile phones, tablets, hand held game computers, and note books. A camera module consists of PCB board, an imaging sensor module and a lens module. The lens module consists of a lens assembly and a housing shielding it from unwanted light and environmental influences. The housing may also be shared with the housing of the complete camera module. The outer contours of a compact camera module are in many cases designed as drop-in component into mobile devices.

The mass volume requirements together with the increasing drive for reducing costs triggered the development of wafer level based methods for producing and packaging the camera modules and related image sensor and optics.

The aim of packaging is to integrate the several optical, mechanical, environmental and electronic functions of a compact camera module and a lens module. The functional elements consist of a CMOS or CCD image capturing device, the imaging lenses together with optical functions such as IR filters, AR coats and light blocking structures such as baffles etc. In most cases, micro lenses and color filters are positioned on the image sensor surface.

The lens elements are usually formed by injection moulding or glass pressing. Integrated lens stacks relating to lens assemblies based on wafer level manufacturing have been disclosed in WO2004027880. In this process, lens elements, spacers and other optical functions are manufactured at the wafer level. After singulation (i.e. separation of the wafer into individual modules) integrated lens modules are obtained.

Wafer level manufacturing of opto-electronic components in general assumes a wafer to wafer assembly of the optics wafer with the image sensor wafer. The aim is to reduce costs through maximizing the simultaneous processing of components followed by a singulation, usually dicing, step. This assumption is based on the very high yields using state-of-art manufacturing front end processes for electronic components on silicon wafers. These processes benefit from a decades track record of process development using silicon as a substrate. However, the processes for manufacturing optical components on wafer level are based on different materials (glass, polymer) and processes (injection moulding, UV, thermal replication, glass pressing). In addition, refractive optical structures require extreme, i.e. high, shape accuracies with comparably high aspect ratios. So, in many cases, the yield involving manufacturing of optics on wafer level is lower than may be obtainable for electronic components. As a result an image sensor module wafer with good yield may be assembled on an optical wafer with a lower yield. Reject optics may therefore be combined with good image sensors, resulting in reject compact camera module despite the presence of good electronic components. A feature of a wafer to wafer approach is the possible or inherent footprint mismatch between the optics and the image sensor resulting in increasing manufacturing costs for the optics and resulting compact camera module.

Another feature involves the control of the Back Focal length (BFL) of the imaging optics. The control of the BFL within microns is a main contributor to the yield in manufacturing compact camera module. The BFL is to a large extent determined through the wafer level control on of the thickness and shape tolerances in all optical and spacer layers of the integrated lens stack.

The wafer level module technology mainly adopts wafer level fabrication technique in electronic products to miniaturize volumes of electronic products and reduce fabrication costs. The wafer level module technology is also applied in the fabrication of wafer level optical lens modules, such that volumes of wafer level optical lens modules can be greatly reduced comparing to that of conventional lens modules. Wafer level optical lens modules are consequently utilized in camera modules of cellular phones, for example.

US2011222173 relates to a method of fabricating a wafer level optical lens substrate, comprising: providing a substrate; forming at least one through hole on the substrate and forming a flange on a side wall in each through hole; and forming a lens on the flange in each through hole and embedding the lens with the flange.

US2009022949 relates to a process for producing a functional-element-mounted module, comprising the steps of disposing a substrate having mounted thereon a functional element having a mounting portion and a resin sealing plate formed therein with an opening corresponding in position to the functional portion of the functional element as opposed to each other at a predetermined distance; and impregnating and filling a sealing resin between the substrate and the resin sealing plate utilizing a capillary phenomenon.

In addition, when assembling a lens module upon the image sensor module, the distance between the bottom optical surface of the lens module and the image plane has to be very accurately controlled. This can be performed through active alignment assembly methods, wherein the image is projected on an image sensor and the quality of the resulting focal position is measured. According to the result, the lens module is vertically displaced to a position where an optimal image quality is obtained. The whole procedure of measuring and adjusting is time consuming and requires expensive assembly with in line focus length measurement.

From U.S. Pat. No. 3,532,038 there is known an optical system in which a transparent base member is provided with lenticular lens cavities, which cavities are filled with a refractive fluid, the surface of which fluid is covered with a cover member. The cover member is provided with an aperture plate, on which finally a second base member is present, which is also provided with lenticular lens cavities, which cavities are likewise filled with a refractive fluid.

From US 2004/0100700 there is known a method of manufacturing a microlens array, wherein the cavities in a mould are filled with a UV curable resin, whilst the resin outside the cavities is removed by placing a transparent quartz board on top of the mould. The fluid present in the cavities is then formed into a plurality of separate lenses, whereupon a second UV curable resin layer is applied to the transparent board, which resin layer is cured by making use of the already formed separate lenses. The excess amount of the cured second resin layer is removed by using an organic solvent. Only one layer of replicated lenses is mentioned in said document, which lenses are separately arranged and do not exhibit any interconnection.

From International application WO 03/069740 in the name of the present inventor there is also known a replication process by which an optical element is formed.

WO2012100356 relates to a method for manufacturing a plurality of optical devices, comprising the steps of: providing a replication tool, the replication tool comprising a replication surface defining an array of replication cells, each replication cell comprising a lens replication portion and a spacer replication portion, bringing the replication tool and a support in contact with each other with replication material between the replication surface and the support; causing the replication material to harden, wherein, during the step of causing the replication material to harden, the lens replication sections are caused to be kept at a distance from the support.

From the above state of the art there are thus known methods by which optical systems are obtained which are made up of separately manufactured optical elements, as a result of which the dimensions of such systems may be considered to be large. In addition, the positional accuracy, viz. in the X, Y and Z directions (between the lens surfaces) of such systems may be called critical.

From the above state of the art there are thus known methods by which lenses are replicated on substrates to obtain a single sided our double sided lens wafer. These substrates may be provided with coatings and/or diaphragm/aperture structures. Spacer wafers are provided between the lens wafers in order to achieve the total optical track length of the system.

A feature of these substrates is that the thickness is too high, i.e. stiff substrates have a thickness typically above 300 microns, and such a thickness needs be eliminated. In addition, glass substrates are regarded as expensive materials, particular when tight thickness control, i.e. below 5 microns, comes in question. Furthermore, tight thickness control is also a cost issue for the spacer wafers. In addition, lens substrates and spacer wafers must be assembled with adhesives, resulting in strict controlling XY and Z positions. Furthermore, some transparent substrates have undesirable optical properties, such as refractive index, Abbe number, resulting in unwanted interference with the optical system.

And the method of replicating of lenses within the apertures of a spacer wafer has an effect on the height, but still requires a tight tolerance of the stiff substrate used. In addition, the control of the shape of the lenses is somewhat difficult, especially the risk of the formation of bubbles, and/or a multistage process is required, comprising steps of, inter alia, filling holes with polymer, curing thereof, flattening of filled spacer wafer and replicating lenses on the filled holes.

Thus it is an object of the present invention to provide a method for manufacturing an optical unit in which the desired dimensional precision of the lens system can be achieved without the dimensions of the optical unit increasing undesirably.

Another object of the present invention is to provide a lens assembly, in which well defined lens shapes are present.

SUMMARY OF THE INVENTION

The method according to the present invention is a method of fabricating a wafer level optical lens assembly, comprising:
providing a first wafer substrate having a plurality of bumps;
applying a first polymer liquid on a first contact optical surface of said plurality of bumps;
providing a second wafer substrate;
contacting said first wafer substrate with said second substrate in such that said first polymer liquid is located in a slit created between said first contact optical surface of said plurality of bumps and said second wafer substrate under capillary forces;
curing said polymer liquid(s) to form a lens.

According to such a method two parallel substrates with bumps are brought to close proximity of each other and any polymer liquid between these plates, i.e. moulds, will fill the smallest gaps first, in this case the tops of the bumps. The step of "applying a first polymer liquid on a first contact optical surface of said plurality of bumps" means that a first polymer liquid is dispensed on top of such a bump, especially on each bump present on the first wafer. Such a wafer can have a circular shape, but rectangular or square type wafers can be used as well. The bumps can be regularly spaced on the wafer, in an equidistant space, but the bumps can be placed randomly on the wafer substrate as well. The driving force that causes filling of the smallest gaps first between the two substrates is capillary action. Such a capillary action is an essential technical feature of the present invention because this will create a special shape of radii of the polymer liquid at its both ends. The shape of both outer ends of the polymer liquid is in the present method not dictated by any wall or flange of the substrate, as is the case in for example the above discussed U.S. Pat. No. 8,514,505, related to US2011222173. The outer ends of the lenses manufactured according to U.S. Pat. No. 8,514,505 show an angle with the flanges located on the side wall of each trough hole, which shape is different from the radii shape lens formed according to the present method.

After curing the remaining cavities between the moulds can be filled with polymer material and cured as well. Finally the moulds can be released and the product, i.e. lens, is ready for further processing, e.g. coating, bonding and dicing. During the present process the mutual XYZ positions of the two parallel plates are set and maintained in preset values, determined by a moulding apparatus. Examples of a method for applying a polymer liquid are for example dipping, jetting and dispensing, needle array dipping.

The present method further comprises preferably applying a second polymer liquid on said second wafer substrate before contacting said first wafer substrate with said second substrate. In such an embodiment several layers of polymer liquids can be construed.

It is preferred that the second wafer substrate is a wafer substrate having a plurality of bumps, further comprising applying a second polymer liquid on a second contact surface of said plurality of bumps.

In the case of two different polymers on the first and second contact surface mixing of the polymer liquids is not desirable. It is therefore preferred to cure said second polymer liquid before contacting said first wafer substrate with said second substrate. In such an embodiment the first or the second polymer liquid is in a somewhat cured state. It is also possible to carry out an initial cure of both the first and second polymer liquids and to carry out a final curing step after the contacting step to obtain fully cured polymers. However, for using the capillary forces in an optimum way one of the polymer liquids must be able to flow in a somewhat "free fashion". This means that the shape of both outer ends of that polymer liquid will be formed under these capillary forces. Such a formation of radii is different from just pressing two moulds together, wherein the shape of a polymer located between these moulds is predominantly dictated by the shape of the contact surfaces of both moulds.

The present method further preferably comprises thus curing said first polymer liquid before contacting said first wafer substrate with said second substrate.

According to a preferred embodiment of the present method the step of contacting said first wafer substrate with said second substrate is carried such that the plurality of bumps present on said first wafer substrate are in alignment with the plurality of bumps present on said second wafer substrate.

For obtaining an exact positioning in the XY+Z direction it is preferred that at least one of said first wafer substrate and said second wafer substrate is provided with spacers for contacting and positioning to a preset distance between said first wafer substrate and said second wafer substrate after said step of contacting said first wafer substrate with said second substrate. According to such a method it is possible to provide the combination of first wafer substrate and said second wafer substrate with a so called "pin and hole" construction enabling a precise XY+Z direction of these two substrates.

After the step of curing said polymer liquid(s) it is preferred to fill a third polymer between said first wafer substrate and said second wafer substrate utilizing a capillary phenomenon, wherein the third polymer fills the cavities present between first wafer substrate and said second wafer substrate. Such a polymer liquid can be a non-transparent polymer liquid, for example a black colored polymer, or even a light-shielding material or a light-absorbing material. Such a black color prevents scattering of light in the final lens assembly. In a special embodiment the third polymer liquid can be a transparent polymer.

For forming an integral structure located between said first wafer substrate and said second wafer substrate, wherein said integral structure is separated by a plurality of lenses, it is preferred that the present method further comprises curing the third polymer. As discussed above, the lenses are obtained from the first polymer liquid and, eventual the second polymer liquid.

The curing of any polymer liquid is carried out by irradiating with UV and/or by thermal exposure, dependent on the type of polymer used. In case the first and second polymer liquid are of the type of UV curable polymers, the first and second substrate need to be transparent for UV rays. In another embodiment chemically curing polymers, so called two component systems, are preferred, After curing the first wafer substrate and the second wafer substrate are removed for obtaining the assembly of lenses and substrate structure. The term "assembly of lenses and substrate structure" comprises the total structure manufactured between the first wafer substrate and the second wafer substrate. This means that both the first wafer substrate and the second wafer substrate do not form part of the assembly.

The present method further comprises singulating the assembly of lenses and substrate structure into single or plural lens carrier systems. Such a step can be carried out through dicing, or even punching, e.g. round fixtures.

In the present method the thickness of the integral structure formed by the third polymer is greater than the thickness of the lens(es).

The shape of the first and second contact surface of the bumps is preferably chosen from the group of flat, convex, concave, freeform optic, microfluidic, refractive, diffractive, micro lens array and Fresnel.

It is preferred that the shape of the first contact surface differs from the shape of the second contact surface.

The side walls of the bumps preferably have a parabolic shape, especially the side walls of the bumps are provided with a reflective layer, antireflective layer and/or antireflective structure. In the case wherein the lens system is part of a light source the presence of a reflective layer on the wall increases the effectiveness of the emission. The walls have in this case often a parabolic shape.

To take an advantage of the required capillary action it is preferred that the first polymer liquid is chosen such that the contact angle between the first polymer liquid and the first contact surface is less than 90 degrees.

In addition it is preferred that the second polymer liquid is chosen such that the contact angle between the second polymer liquid and the first contact surface is less than 90 degrees. In both embodiments the first and second polymer liquids will be trapped in the slit created between the first contact optical surface of the plurality of bumps and the second wafer substrate, eventually provided with bumps as well, under capillary forces, and these capillary forces will force the polymer liquid to adapt the desired shape of the radii at its both ends.

According to a preferred embodiment the present method, further comprises applying an additional structure layer onto the surface of the cured first polymer and/or the second cured polymer, wherein the additional structure is chosen from the group of aperture, diaphragm and filter, before contacting the first wafer substrate with the second wafer substrate.

The step of applying the additional structure layer is carried out by a coating step, a step of screen printing, ink jet printing or a step of 3 D printing.

The present method is not restricted to the application of two polymer liquids as discussed above but even more polymer liquid layers can be applied in the same manner. This means that the present method further comprises applying a fourth polymer liquid onto the surface of the already cured first polymer and/or the second cured polymer, eventually provided with one or more additional structure layers, before contacting the first wafer substrate with the second wafer substrate. According to such an embodiment lenses comprising plural polymer layers, eventually separated by one or more additional structure layers, can be manufactured.

The materials of the present elements are preferably chosen from the group of UV curable polymers, preferably epoxy, acrylic and nylon type polymers. The polymer material for the first polymer liquid can be different from the polymer material for the second polymer liquid.

According to the preset method very thin lens structures, i.e. a thickness even down to 50 micron, can be manufactured. In addition, it is also possible to be integrated within this thin structure filters and diaphragms. Moreover, plural lens layers with different optical properties can be integrated within this thin structure. In addition, the thin lens manufactured according to the present method is embedded in thicker structure resulting in a robust construction. And the surrounding spacer obtained from the third polymer can also be used as a fixture for drop-in in optical assemblies.

The present method also demonstrates that XYZ tolerances are only determined by the moulding apparatus machine and shrink effects of the polymers used. The optical functions, such as lens, diaphragm, filters and light blocking, and mechanical functions, such as spacers, fixture, are manufactured within the same mould. This prevents tolerance uncertainties created by assembling spacer/fixture structured and lens wafers, manufactured in two different molds or alternative processes. And the present method does not need tight tolerance spacer wafers or lens substrates.

The present invention further relates to a wafer level optical integral lens support, comprising:

a support, having at least one through hole and at least one lens, each located within each through hole and embedded therein, and a thickness of each lens being less than a thickness of the support, wherein both outer ends of each lens located within the through hole are radii shaped under the action of capillary forces.

It is preferred that at least one lens comprises a first cured polymer and a second cured polymer, wherein the range of index (n) and Abbe properties of the first cured polymer and a second cured polymer are different, especially that the support is made of a light-shielding material or a light-absorbing material.

In a preferred embodiment of a wafer level optical integral lens the at least one lens comprises an additional structure chosen from the group of aperture, diaphragm and filter.

The shape of the at least one lens in the preset wafer level optical integral lens support is preferably chosen from the group of flat, convex, concave, freeform optic, microfluidic, refractive, diffractive, micro lens array and Fresnel.

In order to make the aforementioned and other features and advantages of the invention more comprehensible, several embodiments accompanied with drawings are described in detail below. The accompanying drawings are included to provide a further understanding of the invention, and are incorporated in and constitute a part of this specification. The drawings illustrate embodiments of the invention and, together with the description, serve to explain the principles of the invention.

BRIEF DESCRIPTION OF THE DRAWINGS

FIG. 5 shows an embodiment of the present method.
FIG. 6 shows another embodiment of the preset method.
FIG. 7 shows an embodiment of the present method.
FIG. 8 shows another embodiment of the preset method.
FIG. 9 shows an embodiment of the present method.
FIG. 10 shows another embodiment of the preset method.
FIG. 12 shows another embodiment of the preset method.
FIG. 13 shows an embodiment of the present method.
FIG. 20 shows another embodiment of the present method.
FIG. 21 shows another embodiment of the present method.

DETAILED DESCRIPTION OF THE INVENTION

Figure 1:
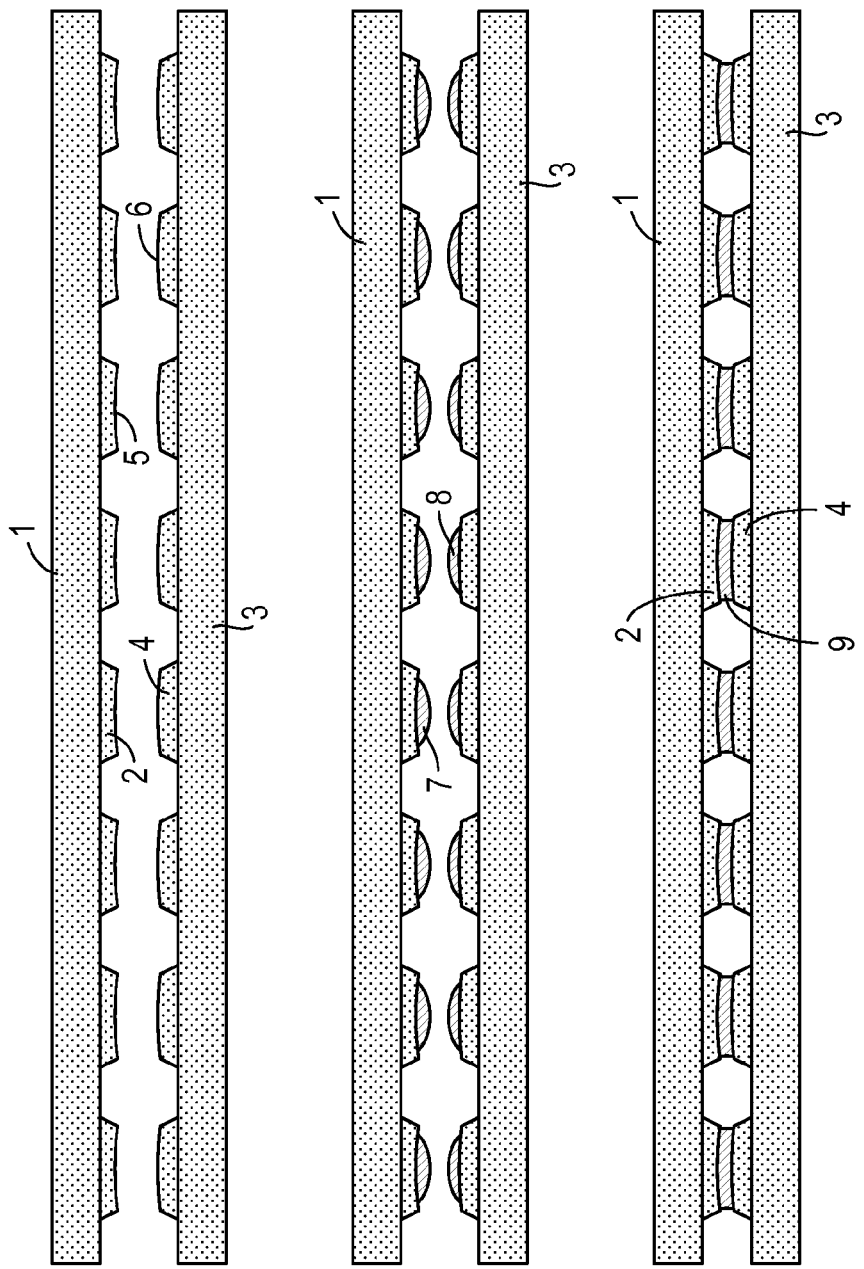
FIG. 1 shows an embodiment of the present method.

FIG. 1 shows a first wafer substrate 1 provided with a plurality of bumps 2 having first contact optical surface 5, and a second wafer substrate 3, also provided with a plurality of bumps 4 having second contact optical surface 6. In a second step a first polymer liquid 7 is applied on the first contact optical surface 5 of the plurality of bumps 2. There is also applied a second polymer liquid 8 on the second contact optical surface 6 of the plurality of bumps 4. In a third step a curing of both polymers 7, 8 takes place forming lens 9. Although FIG. 1 shows an embodiment wherein both first wafer substrate 1 and second wafer substrate 3 is provided with a plurality of bumps, the present invention also includes an embodiment (not shown) wherein only one wafer substrate is provided with a plurality of bumps having a contact optical surface.

Figure 2:
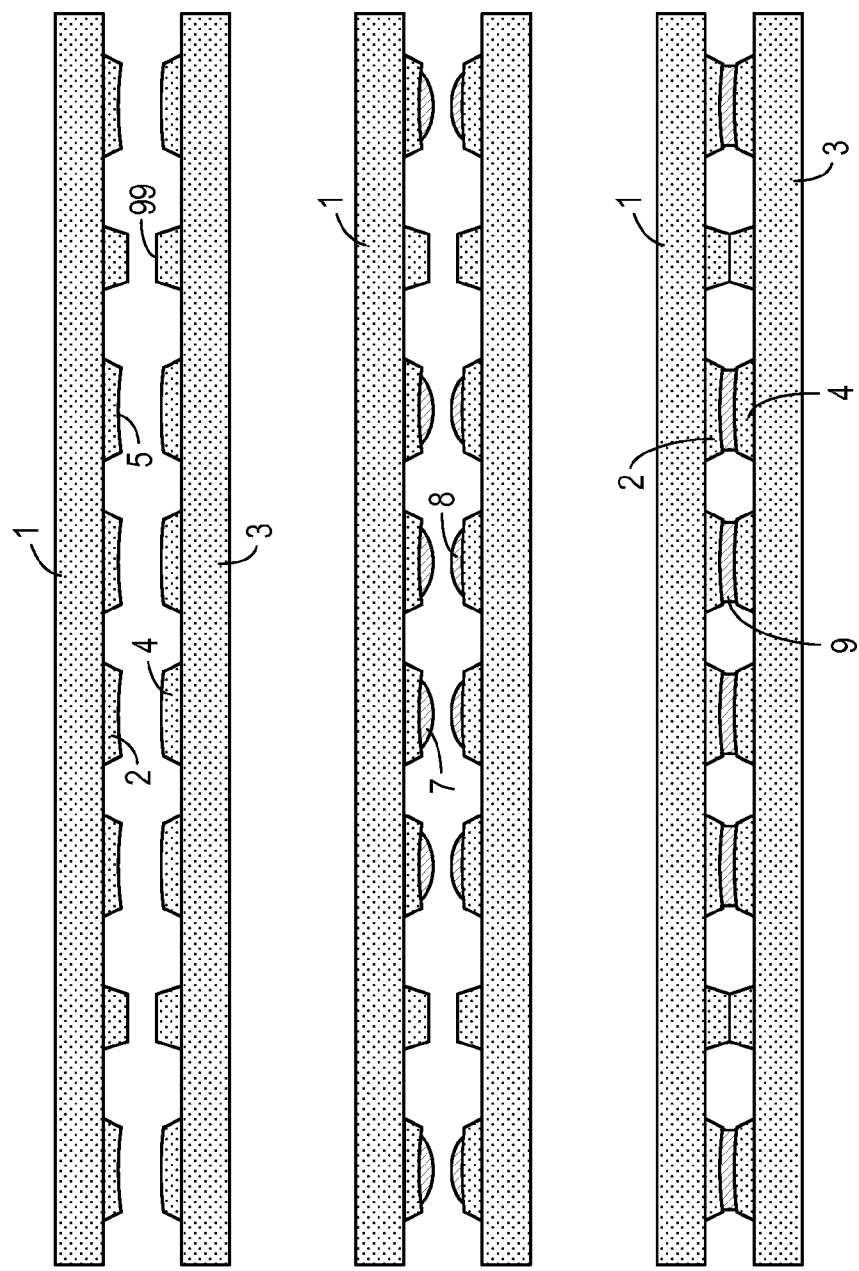
FIG. 2 shows another embodiment of the preset method.

FIG. 2 shows a satiation similar to FIG. 1, except that both first wafer substrate 1 and second wafer substrate 3 are provided with spacers 99 for exactly positioning and contacting both first wafer substrate 1 and second wafer substrate 3 in the XYZ direction. In a third step a curing of both polymers 7, 8 takes place forming lens 9. The number of spacers is not critical and can be any number. In another embodiment (not shown) spacers 99 are only present on one wafer substrate.

Figure 3:
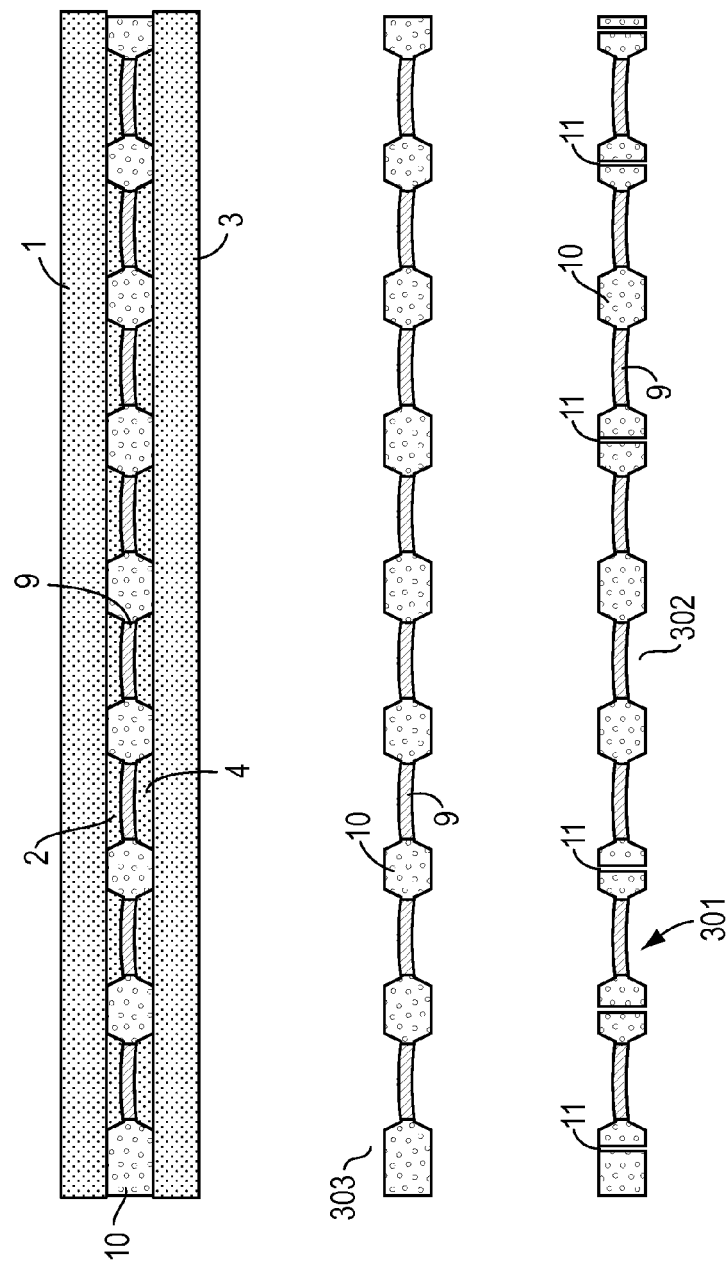
FIG. 3 shows an embodiment of the present method.

FIG. 3 shows a situation in which a third polymer liquid 10 is forced to flow under capillary forces into the cavities located between first wafer substrate 1 and second wafer substrate 3. After filling the cavities polymer liquid 10 is cured, and after removing substrate 1 and substrate 3, an integral structure 303 is obtained, i.e. cured polymer 9, i.e. lens 9, separated by cured polymer 10. Cured polymer 9 functions both as a spacer and a baffle. From FIG. 3 it is clear that the thickness, or height, of polymer 10 is greater that the thickness of lens 9. The integral structure located between the first wafer substrate 1 and the second wafer substrate 3, wherein the integral structure is separated by a plurality of lenses, is obtained after removing substrate 1 and substrate 3. And the method further comprises singulating the assembly of lenses and integral structure 303 via dicing line 11 into single 301 or plural lens carrier systems 302.

Figure 4:
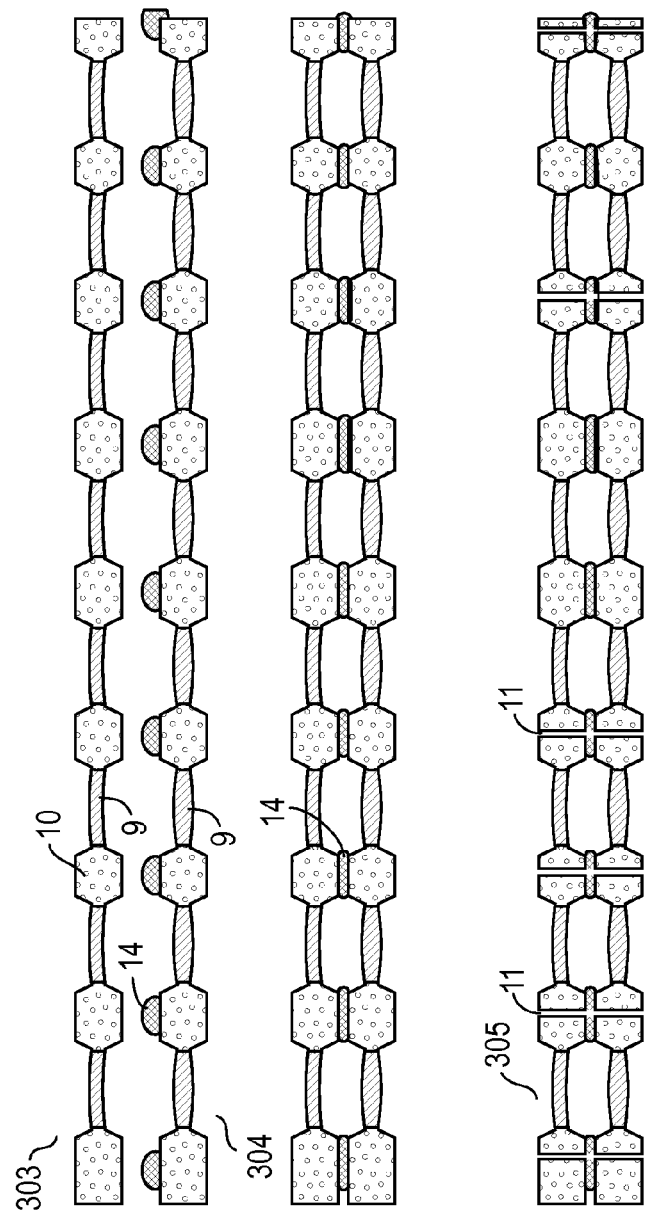
FIG. 4 shows another embodiment of the preset method.

FIG. 4 shows an embodiment in which assembly of lenses and integral structure 303 and assembly of lenses and integral structure 304 are brought into contact with the use of an adhesive 14. According to such a method a kind of stack of assemblies of lenses and integral structures can be obtained. According to such a method it is possible to provide the combination of first wafer substrate and the second wafer substrate with a so called "pin and hole" construction enabling a precise XY+Z direction of these two substrates. The method further comprises singulating the assembly of lenses and integral structure 305 via dicing line 11 into single or plural lens carriers. Spacer pins can also be used to achieve a minimum distance in order to offset the shrinkage of the polymer. By using the moulding apparatus the molds can be drawn slightly apart so that the spacer pins do not touch each other. The spacer pins can make contact (again) after the known shrinkage of the polymer.

FIG. 5 clearly shows that contacting the first wafer substrate 1 with the second substrate 3 results in locating first polymer liquid 9 in a slit created between the first contact optical surface 5 of the plurality of bumps 2 and the second wafer substrate 3 under capillary forces. Both outer ends 15,16 of first polymer liquid 9 located within the slit are radii shaped under the action of capillary forces. The method further comprises the introduction of a third polymer liquid 10 into the cavities located between first wafer substrate 1 and second wafer substrate 3.

FIG. 6 shows the resulting wafer level optical integral lens support, comprising a support 10, having at least one through hole and at least one lens 9, located within each through hole and embedded therein, wherein the thickness of each lens 9 being less than a thickness of the support 10, wherein both outer ends 16,15 of lens 9 located within the through hole are radii shaped under the action of capillary forces.

FIG. 7 shows another embodiment of specific shapes of radii, i.e. outer ends 17, 18 of first polymer liquid 9 located within the slit are radii shaped under the action of capillary forces. The slit is slit created between the first contact optical surface 5 of the plurality of bumps 2 of first optical substrate 1 and the second contact optical surface 6 of the plurality of bumps 4 of second wafer substrate 3. The method further comprises the introduction of a third polymer liquid 10 into the cavities located between first wafer substrate 1 and second wafer substrate 3. The introduction of this third polymer liquid takes place after curing first polymer liquid 9.

FIG. 8 shows the resulting wafer level optical integral lens support, comprising a support 10, having at least one through hole and at least one lens 9, located within each through hole and embedded therein, wherein the thickness of each lens 9 being less than a thickness of the support 10, wherein both outer ends 17, 18 of lens 9 located within the through hole are radii shaped under the action of capillary forces.

FIG. 9 shows another embodiment in which already cured polymer liquid 7, present on first wafer substrate 1 is brought into contact with second wafer substrate 3. Second wafer substrate comprises already cured polymer 8 on which a diaphragm 91 has been applied.

FIG. 10 shows a further step of the construction shown in FIG. 9, wherein on diaphragm 91 another polymer liquid 92 is applied.

Figure 11:
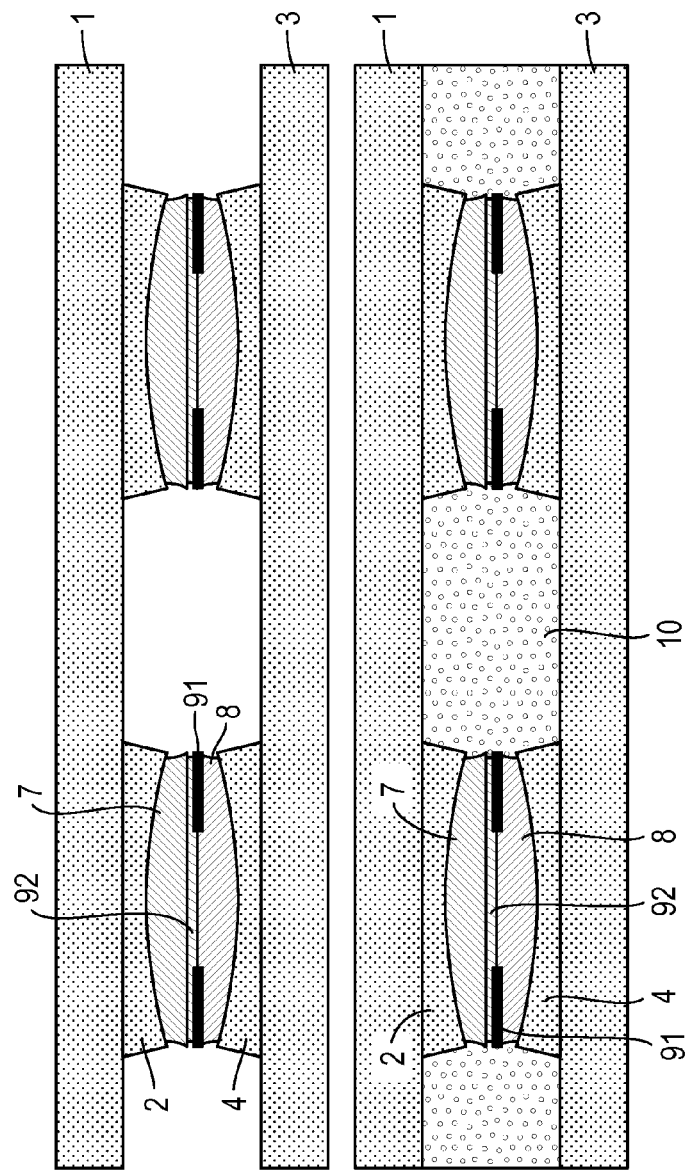
FIG. 11 shows an embodiment of the present method.

FIG. 11 shows a further step of the method of fabricating a wafer level optical lens substrate wherein first wafer substrate 1 is brought into contact with second wafer substrate 3, and after the contact a curing step is carried out. The method further comprises the introduction of a third polymer liquid 92 into the cavities located between first wafer substrate 1 and second wafer substrate 3.

FIG. 12 shows the resulting wafer level optical integral lens support, comprising a support 10, having at least one through hole and at least one lens 9, comprising cured polymers 7, 8. 92 and a diaphragm 91 embedded therein, wherein the thickness of components 7, 8, 92 being less than a thickness of the support 10.

FIG. 13 shows another embodiment of wafer level optical integral lens support, comprising a support 10, having at least one through hole and two lenses 7,8 wherein the thickness of components 7, 8 being less than a thickness of the support 10, wherein both outer ends 30, 131 of lens 7,8 located within the through hole are radii shaped under the action of capillary forces.

Figure 14:
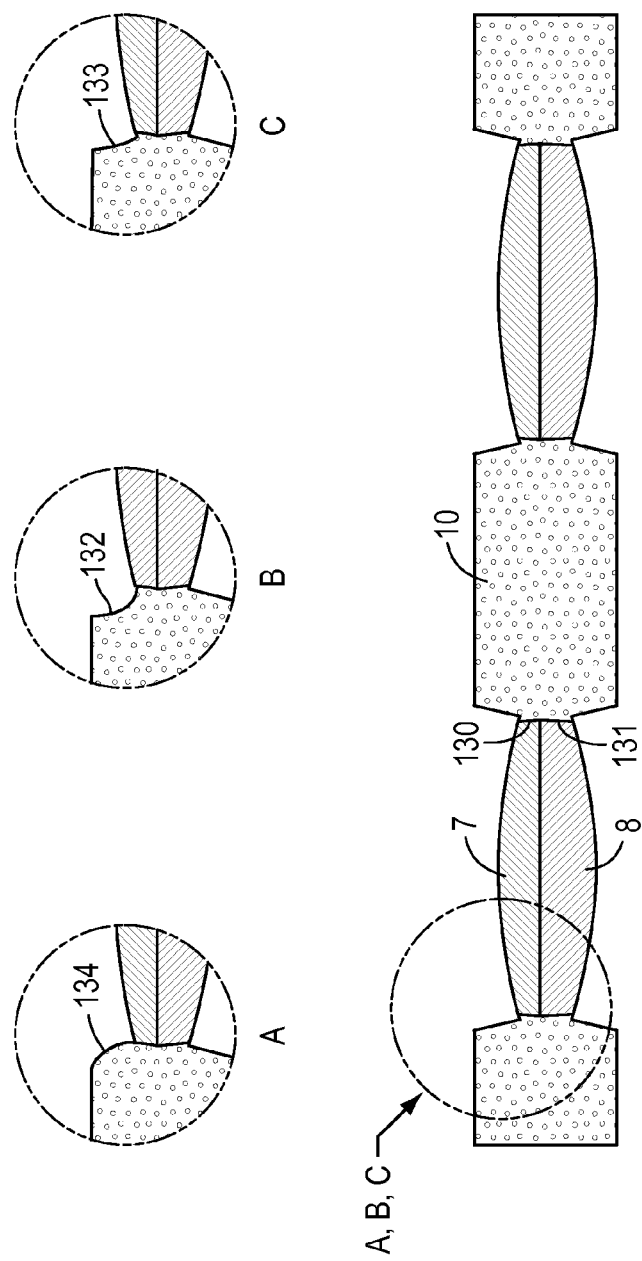
FIG. 14 shows another embodiment of the preset method.

FIG. 14 shows in A, B and C the effect of having different shapes of the side walls 132, 133, 134 of bumps on the shape of support 10.

Figure 15:
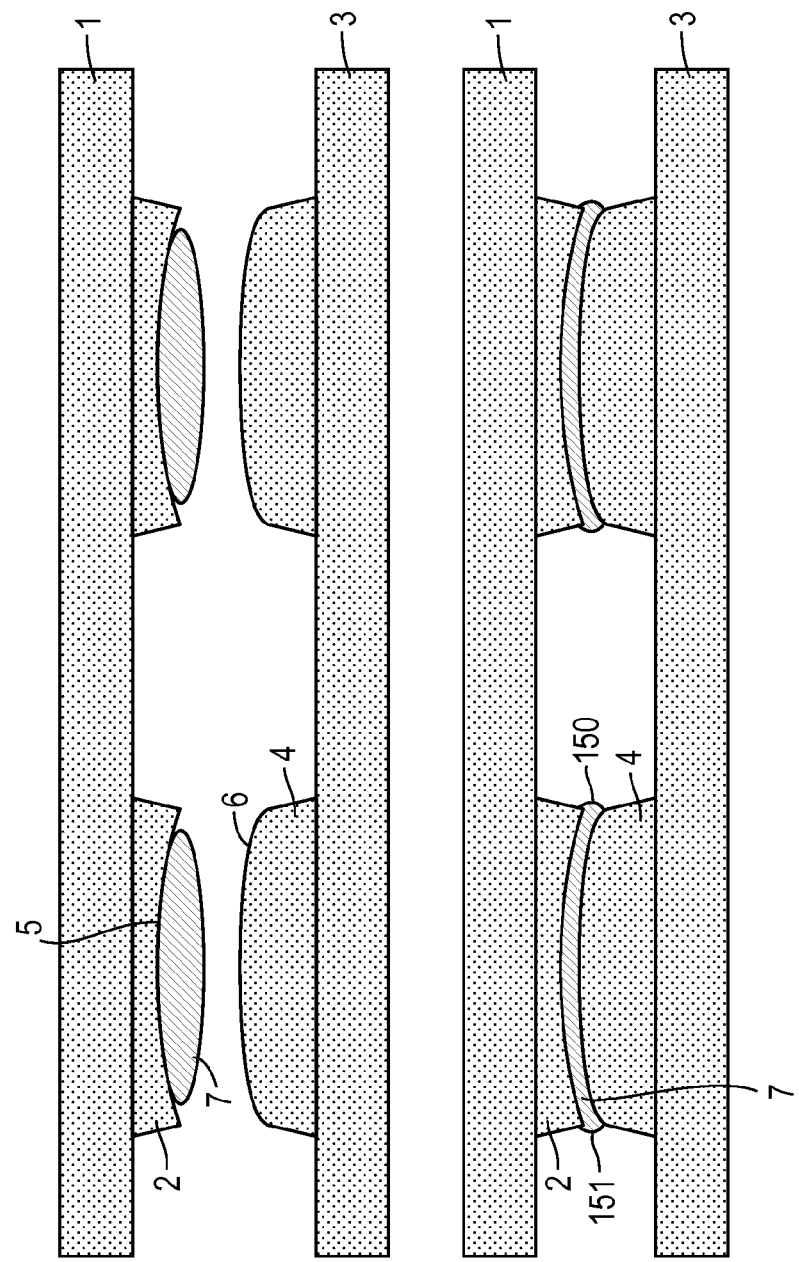
FIG. 15 shows an embodiment of the present method.

FIG. 15 shows a further step of the method of fabricating a wafer level optical lens substrate wherein first wafer substrate 1 is brought into contact with second wafer substrate 3, and wherein both outer ends 150, 151 of polymer liquid 7 are radii shaped under the action of capillary forces.

Figure 16:
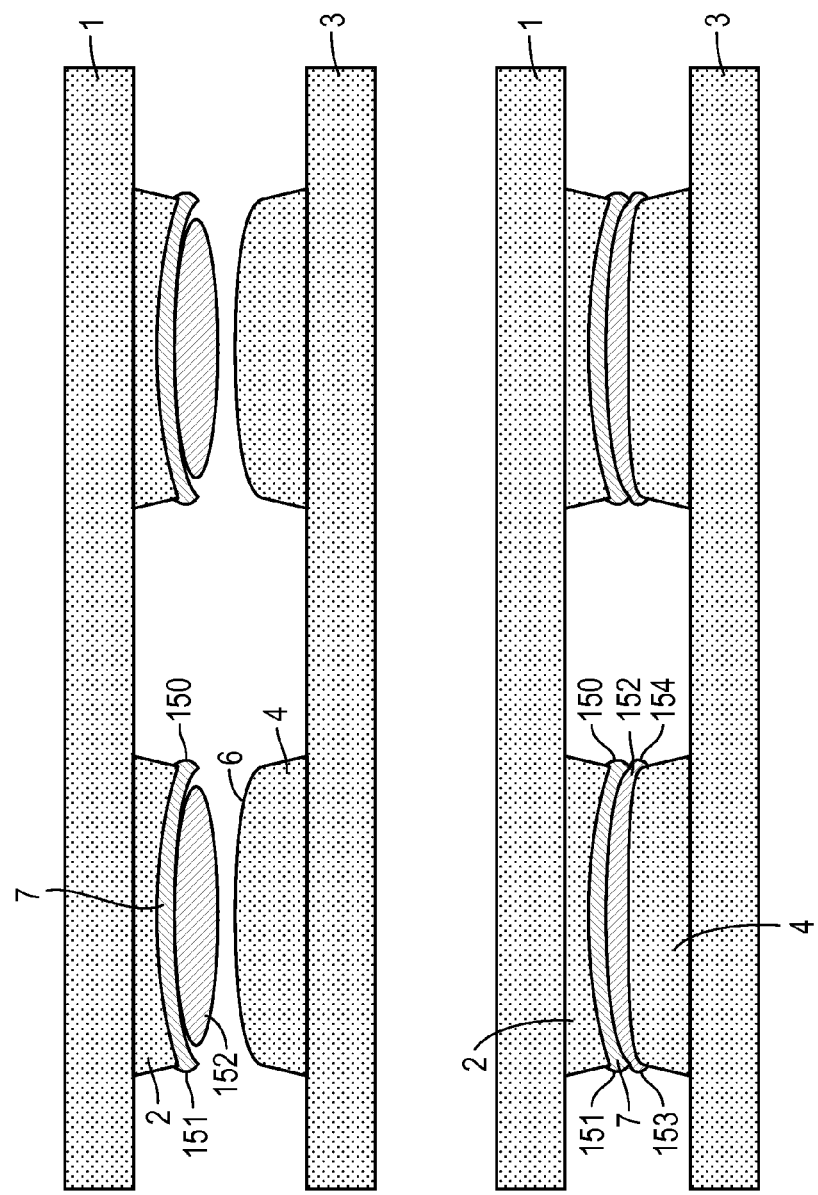
FIG. 16 shows another embodiment of the present method.

FIG. 16 shows a further step of the construction shown in FIG. 15. After curing the polymer liquid 7 another polymer liquid 152 is applied on the contact surface of cured polymer 7. First wafer substrate 1 is brought into contact with second wafer substrate 3 thus forming outer ends 154, 153 of polymer liquid 152 which are radii shaped under the action of capillary forces.

Figure 17:
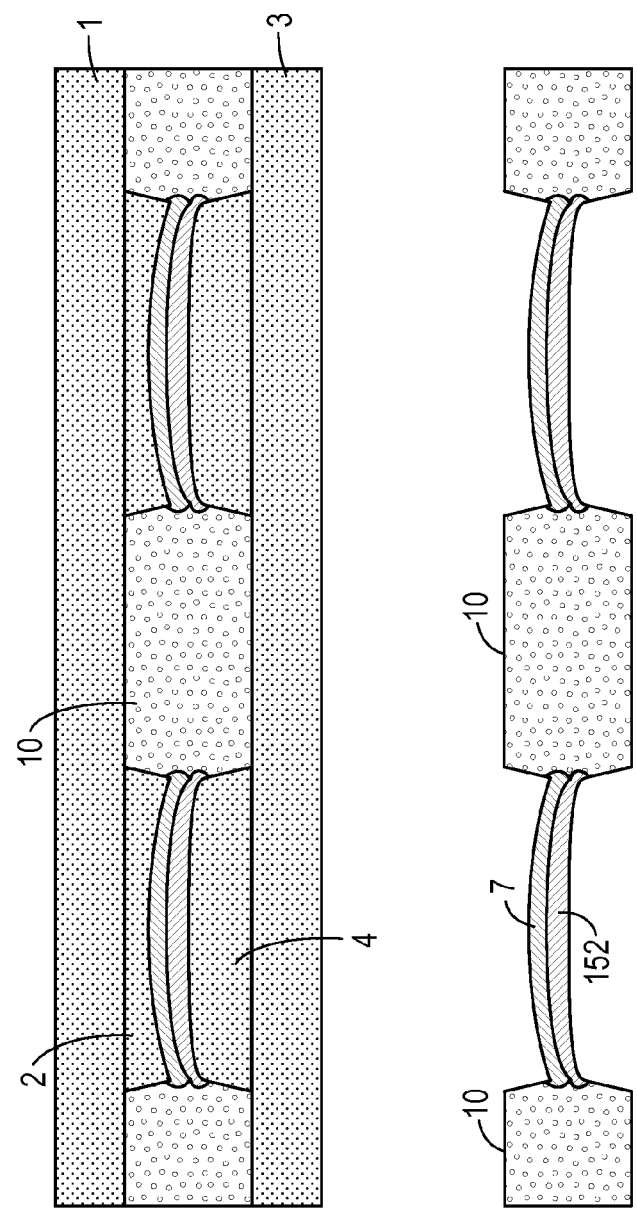
FIG. 17 shows another embodiment of the present method.

The method further comprises the introduction of another polymer liquid 10 into the cavities located between first wafer substrate 1 and second wafer substrate 3, as shown in FIG. 17. The final wafer level optical integral lens support is obtained after removing between first wafer substrate 1 and second wafer substrate 3.

Figure 18:
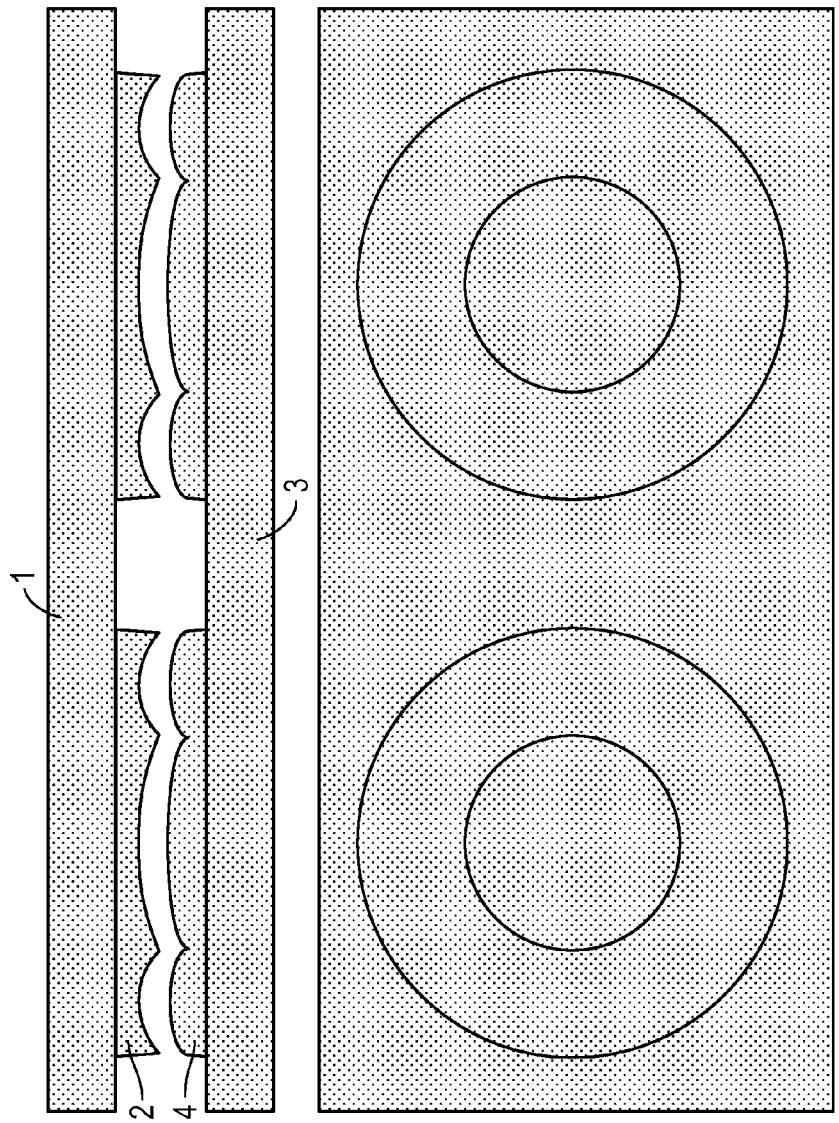
FIG. 18 shows an embodiment of the present method.

FIG. 18 shows an embodiment of a first wafer substrate 1 having plurality of complex shaped bumps 2 and second wafer substrate plurality of complex shaped bumps 4.

Figure 19:
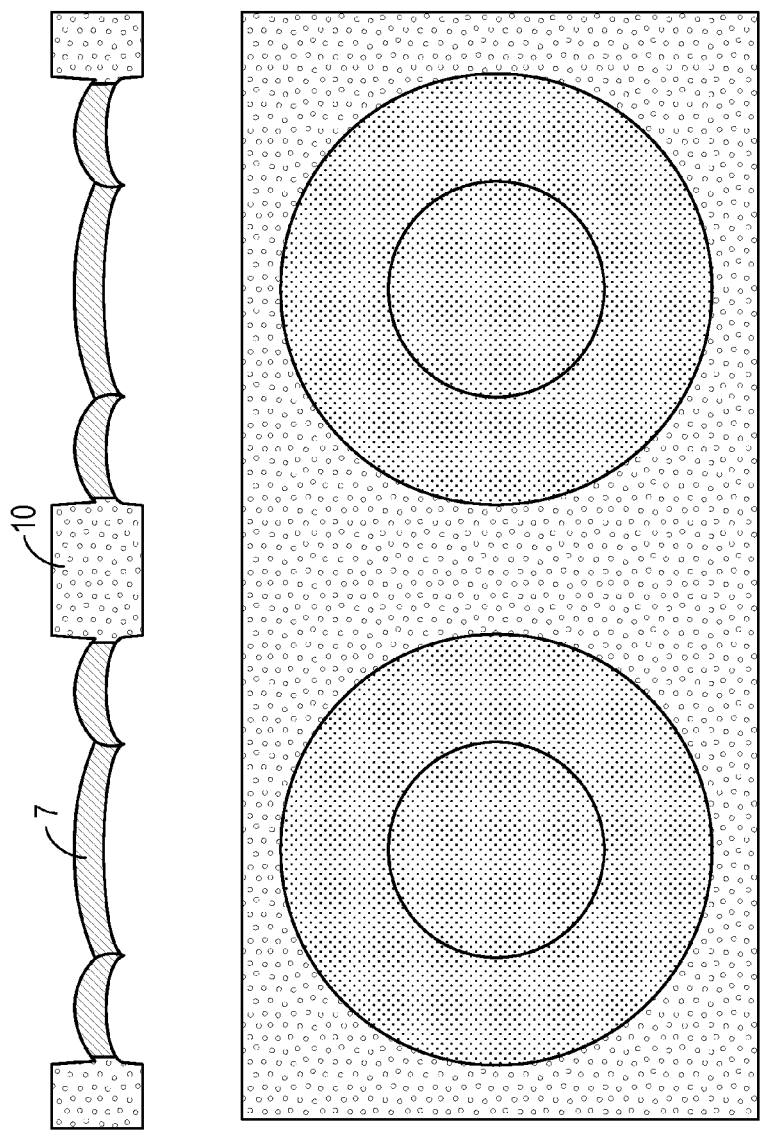
FIG. 19 shows another embodiment of the present method.

FIG. 19 shows a final wafer level optical integral lens support obtained with the wafer substrates as shown in FIG. 18. The central portion and the periphery portion can consist of two different materials. In this case, each zone must be individually replicated. The bump may, for example, already contain the periphery layer, after which the central layer is applied by this method.

FIG. 20 shows a final wafer level optical integral lens support having a Fresnel type lens structure 7. Such a final wafer level optical integral lens support can be obtained by using a first wafer substrate provided with a plurality of bumps, i.e. a structured surface in order to obtain the Fresnel type lens structure 7, and a second wafer substrate without any bumps.

FIG. 21 shows another embodiment in which between a first wafer substrate 1 provided with a plurality of bumps 2 having a specific shape 201, and a second wafer substrate 3, also provided with a plurality of bumps 4 a first polymer liquid 7 is cured. The first polymer liquid 7 is located in a slit created between the first contact optical surface of the plurality of bumps and the second wafer substrate under capillary forces thereby forming outer ends of polymer 7 which are radii shaped under the action of capillary forces.

Figure 22:
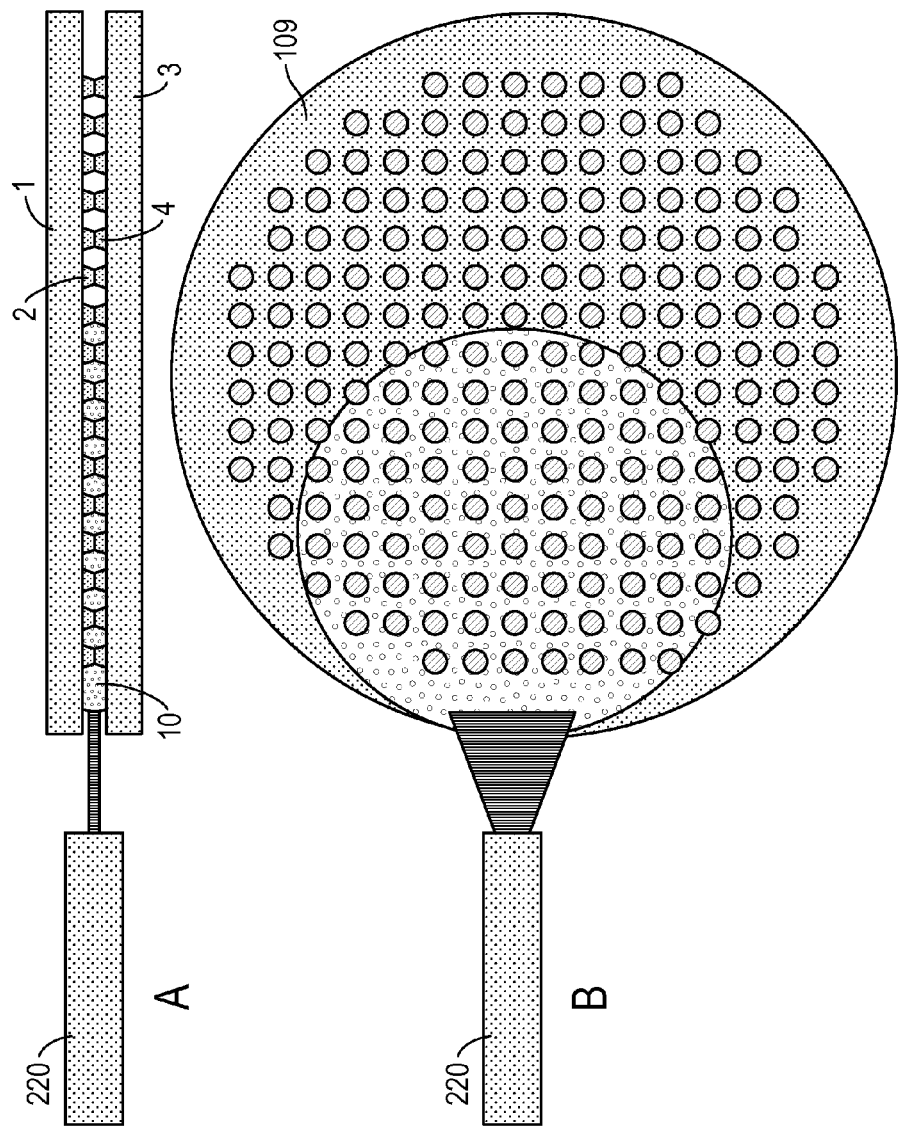
FIG. 22 shows an embodiment of the present method.

FIG. 22 A shows a dispensing apparatus 220 dispensing polymer liquid into the cavities located between first wafer substrate 1 and second wafer substrate 3. As shown her, wafer substrates 1, 3 can be of circular shape. FIG. 22 B shows a top view oft FIG. 22 A.

Figure 23:
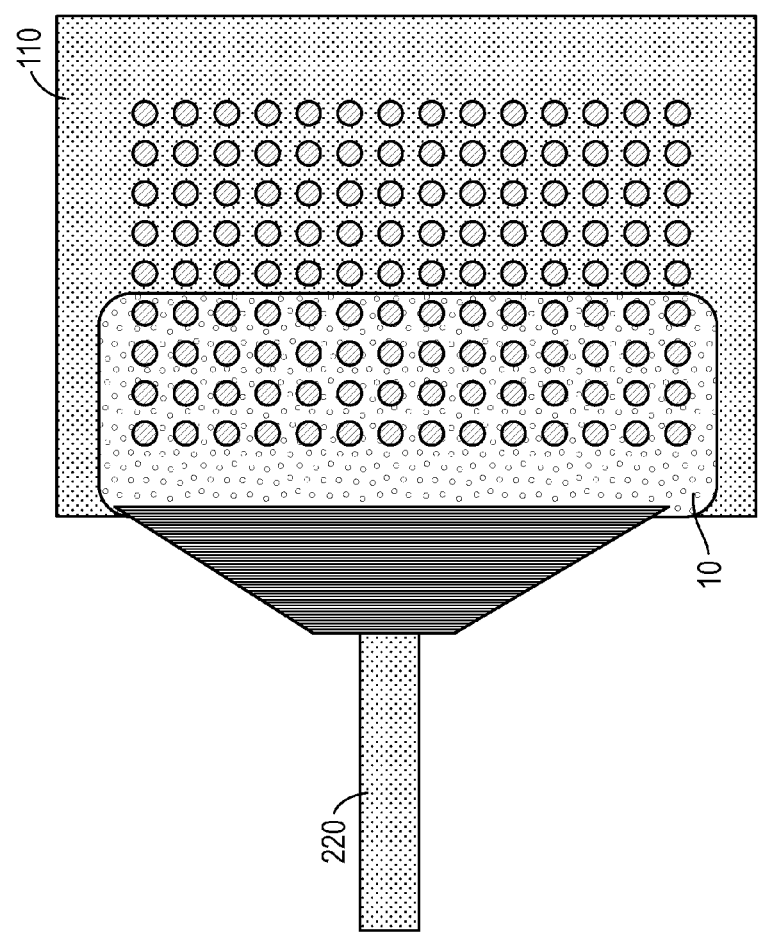
FIG. 23 shows another embodiment of the present method.

FIG. 23 shows a dispensing apparatus 220 dispensing polymer liquid 10 into the cavities located between first wafer substrate 1 and second wafer substrate 3. As shown her, wafer substrates 1, 3 has a rectangular shape. If necessary, vacuum conditions can be applied when dispensing polymer liquid 10 into the cavities located between first wafer substrate 1 and second wafer substrate 3.

What is claimed is:

1. A method of fabricating a wafer level optical lens assembly, comprising:
   providing a first wafer substrate having a plurality of bumps;
   applying a first polymer liquid on a first contact optical surface of said plurality of bumps;
   providing a second wafer substrate;
   contacting said first wafer substrate with said second substrate in such that said first polymer liquid is located in a slit created between said first contact optical surface of said plurality of bumps and said second wafer substrate under capillary forces;
   curing said polymer liquid(s) to form a lens;
   filling a third polymer between said first wafer substrate and said second wafer substrate utilizing a capillary phenomenon, and curing said third polymer to form an integral structure located between said first wafer substrate and said second wafer substrate, wherein said integral structure is separated by a plurality of lenses.

2. A method according to claim 1, further comprising applying a second polymer liquid on said second wafer substrate before contacting said first wafer substrate with said second substrate.

3. A method according to claim 2, further comprising curing said second polymer liquid before contacting said first wafer substrate with said second substrate.

4. A method according to claim 3, further comprising applying an additional structure layer onto the surface of the cured first polymer and/or the second cured polymer, wherein said additional structure is chosen from the group of aperture, diaphragm and filter, before contacting said first wafer substrate with said second wafer substrate.

5. A method according to claim 4, wherein the step of applying said additional structure layer is carried out by a coating step, a step of screen printing, ink jet printing or a step of 3 D printing.

6. A method according to claim 2, wherein the second polymer liquid is chosen such that the contact angle between the second polymer liquid and the first contact surface is less than 90 degrees.

7. A method according to claim 1, wherein said second wafer substrate is a wafer substrate having a plurality of bumps, further comprising applying a second polymer liquid on a second contact surface of said plurality of bumps.

8. A method according to claim 7, wherein said step of contacting said first wafer substrate with said second substrate is carried such that the plurality of bumps present on said first wafer substrate are in alignment with the plurality of bumps present on said second wafer substrate.

9. A method according to claim 7, wherein the shape of the first and second contact surface of the bumps is chosen from the group of flat, convex, concave, freeform optic, microfluidic, refractive, diffractive, micro lens array and Fresnel.

10. A method according to claim 9, wherein the shape of the first contact surface differs from the shape of the second contact surface.

11. A method according to claim 7, wherein the side walls of the bumps have a parabolic shape, especially that the side walls of the bumps are provided with a reflective, antireflective layer and/or antireflective structure.

12. A method according to claim 1, further comprising curing said first polymer liquid before contacting said first wafer substrate with said second substrate.

13. A method according to claim 1, wherein at least one of said first wafer substrate and said second wafer substrate is provided with spacers for contacting and positioning to a preset distance between said first wafer substrate and said second wafer substrate after said step of contacting said first wafer substrate with said second substrate, especially for positioning in the XY+Z direction.

14. A method according to claim 1, further comprising removing the first wafer substrate and the second wafer substrate.

15. A method according to claim 14, further comprising singulating the assembly of lenses and integral structure into single or plural lens carrier systems.

16. A method according to claim 1 wherein the thickness of the integral structure formed by said third polymer is greater than the thickness of the lens(es).

17. A method according to claim 1, wherein the first polymer liquid is chosen such that the contact angle between the first polymer liquid and said first contact surface is less than 90 degrees.

18. A method according to claim 1 further comprising applying a fourth polymer liquid onto the surface of the cured first polymer and/or the second cured polymer, eventually provided with an additional structure layer, before contacting said first wafer substrate with said second wafer substrate.

19. A method according to claim 1, wherein said curing is carried out by irradiating with UV and/or by thermal exposure.

20. A wafer level optical integral lens support, comprising:
a support formed utilizing a capillary phenomenon, having at least one through hole and
at least one lens, each located within each through hole and embedded therein, and a thickness of each lens being less than a thickness of the support, wherein both outer ends of each lens located within said through hole are radii shaped under the action of capillary forces.

21. A wafer level optical integral lens support according to claim 20, wherein said at least one lens comprises a first cured polymer and a second cured polymer, wherein the range of index (n) and Abbe properties of said first cured polymer and a second cured polymer are different.

22. A wafer level optical integral lens support according to claim 20, wherein said support is made of a light-shielding material or a light-absorbing material.

23. A wafer level optical integral lens support according to claim 20, wherein said at least one lens comprises an additional structure chosen from the group of aperture, diaphragm and filter.

24. A wafer level optical integral lens support according to claim 20, wherein the shape of said at least one lens is chosen from the group of flat, convex, concave, freeform optic, microfluidic, refractive, diffractive, micro lens array and Fresnel.

* * * * *